United States Patent
Walker et al.

(10) Patent No.: US 8,840,089 B2
(45) Date of Patent: Sep. 23, 2014

(54) ELECTRIC WEB FENCE

(75) Inventors: Rodney Lynn Walker, Cullman, AL (US); Anthony David Starnes, Hanceville, AL (US); John Oliver Nielsen, Cullman, AL (US)

(73) Assignee: Electra-Lock Fence Systems, Inc., Cullman, AL (US)

( * ) Notice: Subject to any disclaimer, the term of this patent is extended or adjusted under 35 U.S.C. 154(b) by 0 days.

(21) Appl. No.: 13/210,705

(22) Filed: Aug. 16, 2011

(65) Prior Publication Data

US 2012/0205602 A1 Aug. 16, 2012

Related U.S. Application Data

(60) Provisional application No. 61/379,619, filed on Sep. 2, 2010.

(51) Int. Cl.
*A01K 3/00* (2006.01)

(52) U.S. Cl.
CPC ........................................ *A01K 3/005* (2013.01)
USPC ........................................................ 256/10

(58) Field of Classification Search
USPC .................. 256/10, 32, 33, 34, 37, 49, 51, 55
See application file for complete search history.

(56) References Cited

U.S. PATENT DOCUMENTS

| | | | | |
|---|---|---|---|---|
| 2,052,774 A | * | 9/1936 | Kundert | 256/32 |
| 2,437,344 A | * | 3/1948 | Behlmann | 174/163 F |
| 2,445,009 A | * | 7/1948 | Strauss et al. | 174/45 R |
| 2,450,730 A | * | 10/1948 | Hord | 174/45 R |
| 2,530,247 A | * | 11/1950 | Koonz | 256/10 |
| 2,574,052 A | * | 11/1951 | Metcalf | 256/10 |
| 2,821,365 A | * | 1/1958 | Lach | 256/19 |
| 2,968,470 A | * | 1/1961 | Pellerito et al. | 256/47 |
| 3,457,358 A | * | 7/1969 | Brumfield | 174/45 R |
| 3,544,071 A | * | 12/1970 | Case | 256/47 |
| 3,809,371 A | * | 5/1974 | Martini | 256/47 |
| 3,898,713 A | * | 8/1975 | Nelson et al. | 256/47 |
| 4,145,030 A | * | 3/1979 | Ingraham | 256/1 |
| 4,692,567 A | * | 9/1987 | Crum | 174/158 F |
| 4,862,637 A | * | 9/1989 | Dressel | 43/98 |
| 4,905,968 A | * | 3/1990 | Eby et al. | 256/10 |
| 5,920,036 A | * | 7/1999 | Egger | 174/161 F |
| 6,209,853 B1 | * | 4/2001 | Roy et al. | 256/10 |
| 6,834,846 B2 | * | 12/2004 | Robbins, III | 256/10 |
| 6,857,621 B1 | * | 2/2005 | Kamarad et al. | 256/48 |
| 7,968,797 B2 | * | 6/2011 | Williams | 174/154 |

FOREIGN PATENT DOCUMENTS

WO    WO 9501720 A1 * 1/1995

* cited by examiner

*Primary Examiner* — Michael P Ferguson
*Assistant Examiner* — Daniel Wiley
(74) *Attorney, Agent, or Firm* — C. Brandon Browning; Maynard, Cooper & Gale, PC

(57) ABSTRACT

An electric fence including a web of galvanized, high-tensile strength steel wires coupled to and between a pair of posts, the web including a plurality of substantially horizontally extending wires arranged substantially parallel to one another, and a plurality of substantially vertically extending wires arranged substantially parallel to one another and extending to and between each of the horizontally extending wires to form a plurality of wire rectangles, each rectangle having a desired size.

14 Claims, 2 Drawing Sheets

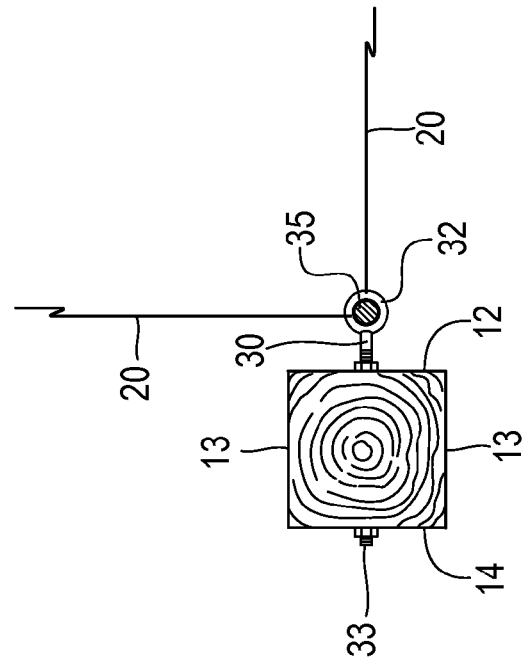
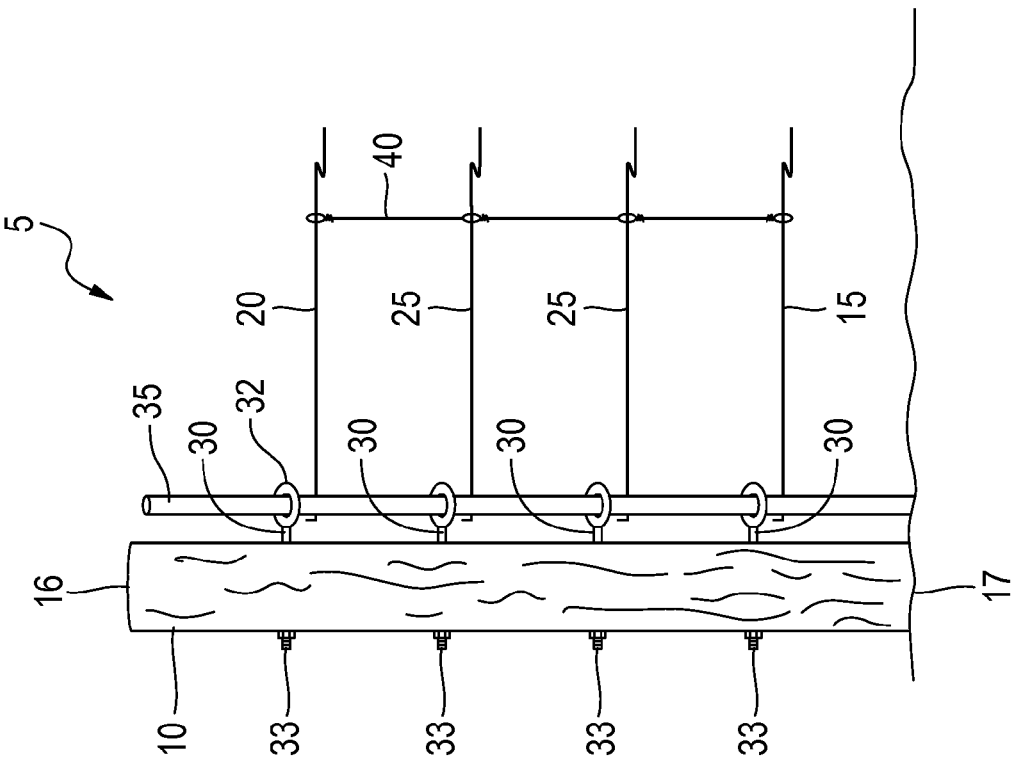

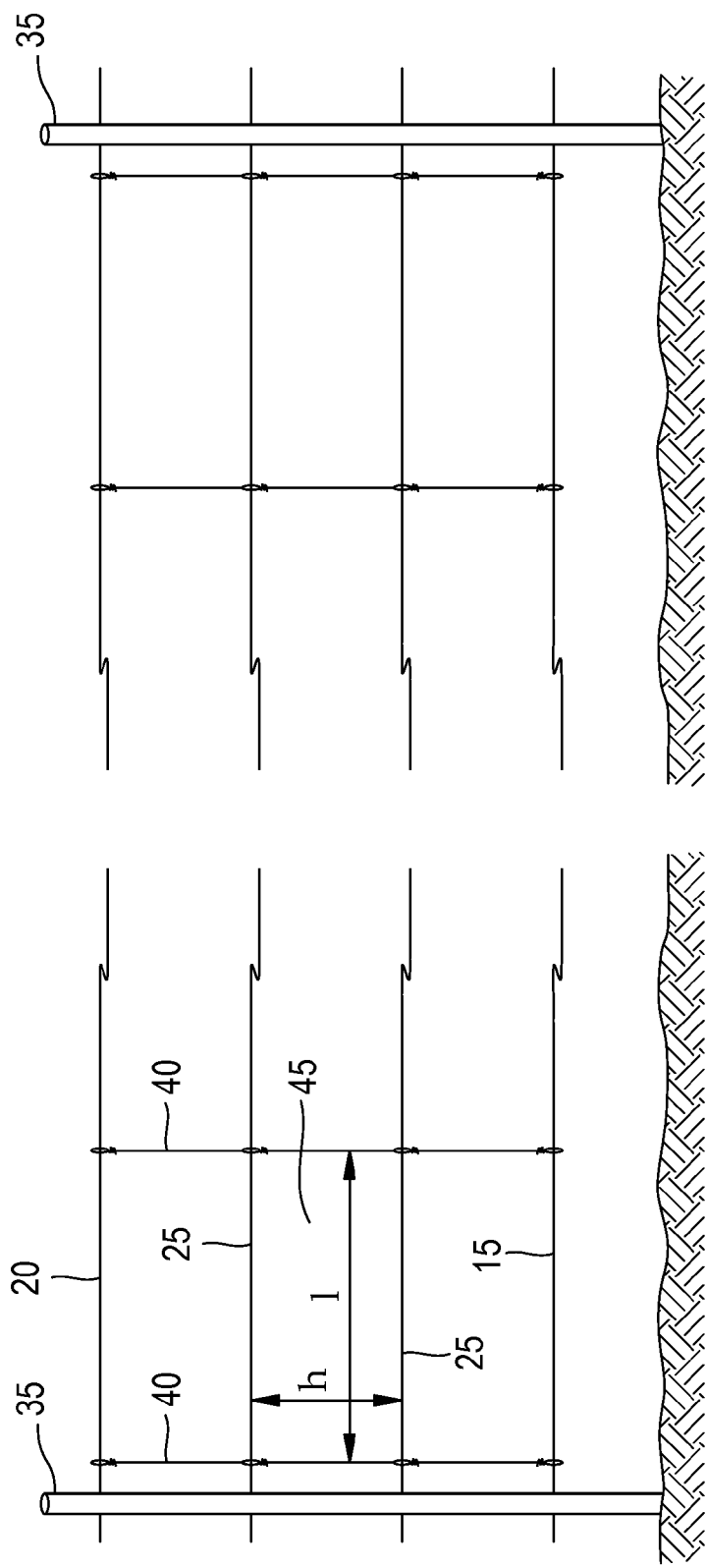

ELECTRIC WEB FENCE

RELATED REFERENCES

This application is a continuation-in-part of and claims priority to U.S. Provisional Patent Application Ser. No. 61/379,619, filed Sep. 2, 2010, the entire contents of which are incorporated herein by reference.

FIELD OF INVENTION

The present invention is directed to an electric fence system for containing livestock. More particularly, the present invention is directed to a fence having a webbed configuration constructed of galvanized, high-tensile strength wire and an energizer for electrifying the fence.

BACKGROUND OF INVENTION

Electric fences are designed to create an electrical circuit when touched by a person or animal. A component called a power energizer converts power into a brief high voltage pulse. One terminal of the power energizer releases an electrical pulse along a connected bare wire about once per second. Another terminal is connected to a metal rod implanted in the earth, called a ground or earth rod. A person or animal touching both the wire and the earth during a pulse will complete an electrical circuit and conduct the pulse, causing an uncomfortable electric shock. The effects of the shock depend upon the voltage, the energy of the pulse, the degree of contact between the recipient and the fence and the ground and the route of the current through the body; it can range from barely noticeable to uncomfortable, painful or for some fences even lethal.

SUMMARY OF THE INVENTION

The present invention is directed to an electric fence system for keeping livestock within an enclosed area and method for installing same. According to one aspect of the invention, there is provided an electric fence including a pair of posts, spaced-apart and anchored in the ground and a web of wires coupled to and between the pair of posts. The web includes a plurality of substantially horizontally extending wires arranged substantially parallel to one another, the plurality of substantially horizontally extending wires including an uppermost wire, a lowermost wire and a plurality of middle wires between the uppermost and lowermost wires. A plurality of substantially vertically extending wires are arranged substantially parallel to one another and extending to and between the uppermost wire and the lowermost wire and being electrically coupled to each wire of the plurality of substantially horizontally extending wires. The web includes a plurality of substantially rectangular sections formed by the intersection of the plurality of substantially horizontally extending wires and the plurality of substantially vertically extending wires. To energize the web a grounded energizer is operatively coupled to the web for electrifying the web.

To minimize the energy required to energize the web for the particular livestock to be contained, galvanized wires are used in constructing the web. The coating of zinc of the galvanized wires lowers resistivity of the wires as compared to wires used for in conventional electric fences. Therefore, less energy output is required to electrify the fence. Additionally, galvanized wires resist corrosion, increasing the lifespan of the fence.

In another aspect of the present invention the plurality of substantially horizontally extending wires includes only four substantially extending wires. In yet another aspect of the present invention, the uppermost and lowermost wires of the substantially horizontal extending wires consist of 12 gauge high-tensile strength steel wires.

BRIEF DESCRIPTION OF THE DRAWINGS

FIG. 1 is a perspective view of an electrified fence at a corner post according to the present invention.

FIG. 2 is an overhead view of an electrified fence at a corner post according to the present invention.

FIG. 3 is a perspective of an electrified fence at a position between two posts.

DETAILED DESCRIPTION OF THE PREFERRED EMBODIMENTS

An electric fence 5 in accordance with the presently preferred embodiment of the present invention is illustrated in FIGS. 1 through 3, where like features of the invention share like numbering.

As illustrated in FIGS. 1 and 2, fence 5 generally includes a corner post 10 with a front side 12, a back side 14, two lateral sides 13, a top 16 and a bottom side 17. Post 10 may be composed of wood or other material and is fixed into the ground or braced at bottom side 17. In a preferred embodiment post 10 is composed of 6×6 pressure treated wood, meaning post 10 has a square cross-sectional shape as seen in FIG. 2 that is approximately 5.5 inches by 5.5 inches. The height of post 10 will vary depending on the livestock to be contained by the fence 5.

A plurality of fastening elements such as eye bolts 30 are coupled at regular intervals along the longitudinal axis of post 10. Eye bolts 30 as seen in FIG. 2 are composed of a ring body 32 encircling a ring opening, the ring body 32 being connected to a threaded shank 33. For bolts 30 to be coupled to the post 10, a plurality of holes approximately the size of shank 33 pass through the post 10 from front side 12 to back side 14 allowing shank 33 of bolt 30 to pass through corner post 10. Once a bolt 30 is coupled to post 10, the shank 33 is oriented away from the back side 14 of post 10 leaving the ring body 32 of the eye bolt 30 in a horizontal orientation parallel to the ground and projecting from the front side 12 of the post 10. In an alternative embodiment, non-conducting insulators, not shown, may be connected to the post 10.

A fiberglass post 35 may be coupled to corner post 10 by inserting the fiberglass post 35 through ring bodies 32 of the plurality of eye bolts 30. Fiberglass post 35 may be used in place of nonconductive insulators. Fiberglass post 35 may have a plurality of openings. These openings pass through the fiberglass post 35 and are found at regular intervals along the longitudinal axis of the fiberglass post 35. To prevent excessive movement of fiberglass post 35 once the post is inserted through ring bodies 32, a first cotter pin may be placed through the uppermost of the openings of fiberglass post 35 where the opening through post 35 is found adjacent to and above the upper most eye bolt 30 coupled to corner post 10 and a second cotter pin may be placed through fiberglass post 35 at the lower most of the openings through post 35 that is adjacent to and below the lowermost eye bolt 30 coupled to the corner post 10.

As can be seen in FIGS. 1 and 3, a web of galvanized, high-tensile strength wires extend between either a corner post 10 coupled to a fiberglass post 35 as in FIG. 1 or a fiberglass post 35 not coupled to a corner post 10 as in FIG. 3 and a second post. The web is formed by a plurality of horizontally extending wires. This plurality of horizontally extending wires consists of an uppermost wire 20, a lowermost wire 15 and middle wires 25 located between uppermost 20 and lowermost wires 15. In one embodiment, uppermost 20, lowermost 15 and middle wires 25 are approximately 10 inches from any adjacent wire and the lowermost wire 15 is suspended above the ground along the entire length of the lowermost wire 15. In another embodiment, the lowermost wire 15 is suspended at least 17 inches from the ground. In yet another embodiment, uppermost 20 and lowermost wires 15 are 12-gauge galvanized, high-tensile strength wire and middle wires 25 are 12.5 gauge galvanized, high-tensile strength wire.

Intersecting approximately perpendicular to the horizontally extending wires are a plurality of vertically extending wires 40 arranged parallel to one another and extending to and between uppermost wire 20 and lowermost wire 15. Where wires 40 intersect or meet uppermost wire 20, lowermost wire 15 and middle wires 25, the wires 40 are coupled to the uppermost 20, lowermost 15 and middle wires 25 by any feasible method of coupling including fixed knot coupling, crimping or other method. As shown in FIG. 3, the intersections of uppermost wire 20, lowermost wire 15 or middle wires 25 with vertically extending wires 40 form a plurality of rectangular sections 45. In one embodiment, each of the plurality of rectangular sections 45 have a length (l) of about 12 inches and a height (h) of about 10 inches. The galvanized, high-tensile strength wires may be assembled offsite into the above described web and wound into a roll to provide ease of transport and installation The web of galvanized, high-tensile strength wires is removably attached to a fiberglass post 35 by passing the ends of the uppermost 20, lowermost 15 and middle wires 25 through the openings of the fiberglass post 35 and crimping, tying or otherwise removably fixing the wires to fiberglass post 35. In another embodiment, the web of galvanized, high-tensile strength wires may be coupled to the fiberglass post 35 by tying, crimping or removably attaching the ends of uppermost wire 20, lowermost wire 15 and middle wires 25 around the circumference of fiberglass post 35 rather than passed through the post. Once the web is removably attached to fiberglass posts 35 enclosing the required area, the web is then coupled to an energizer and ground wire, not shown.

As will be apparent to one skilled in the art, various modifications can be made within the scope of the aforesaid description. Such modifications being within the ability of one skilled in the art form a part of the present invention and are embraced by the claims below.

It is claimed:

1. An electric fence comprising,
a pair of posts, spaced-apart and anchored in the ground,
a web of galvanized steel wires coupled to and between the pair of posts, the web including a plurality of substantially horizontally extending wires arranged substantially parallel to one another, the plurality of substantially horizontally extending wires including an uppermost wire and a lowermost wire, and a plurality of substantially vertically extending wires arranged substantially parallel to one another, the plurality of substantially vertically extending wires extending to and between the uppermost wire and the lowermost wire and being electrically coupled to each wire of the plurality of substantially horizontally extending wires,
a fiberglass post coupled between the pair of posts and directly to the lowermost wire of the web of galvanized steel, the fiberglass post being arranged vertically and including openings through which the web of galvanized steel extends, wherein the openings do not extend through an end of the fiberglass post,
a plurality of eye bolts coupled to and between a post of the pair of posts and the fiberglass post between adjacent horizontal wires of the web, wherein the fiberglass post extends through eyes of the eye bolts, and
a grounded energizer operatively coupled to the web for electrifying the web,
wherein the lowermost wire is suspended above the ground along the entire length of the lowermost wire.

2. The fence according to claim 1 wherein the lowermost wire is suspended at least about 17 inches above the ground.

3. The fence according to claim 1 wherein the web includes a plurality of substantially rectangular sections formed by the intersection of the plurality of substantially horizontally extending wires and the plurality of substantially vertically extending wires, each of the sections of the plurality of substantially rectangular sections having a length of about 12 inches and a height of about 10 inches.

4. The fence according to claim 3 wherein each of the uppermost wire and the lowermost wire is a 12 gauge wire.

5. The fence according to claim 4 wherein each wire of the plurality of substantially vertically extending wires and each wire of the plurality of substantially horizontally extending wires are 12.5 gauge wires, with the exception of the uppermost wire and the lowermost wire.

6. The fence according to claim 5 wherein the plurality of substantially horizontally extending wires includes only four substantially horizontally extending wires.

7. The fence according to claim 1 wherein the web of galvanized steel is tied directly to the fiberglass post.

8. The electric fence according to claim 1 wherein the fiberglass post is spaced apart from the pair of posts.

9. The electric fence according to claim 1 wherein the fiberglass post extends substantially parallel to at least one post of the pair of posts.

10. The electric fence according to claim 1 wherein the fiberglass post is directly anchored in the ground.

11. An electric fence comprising,
a pair of posts, spaced-apart and anchored in the ground,
a web of galvanized steel wires coupled to and between the pair of posts, the web including four substantially horizontally extending wires arranged substantially parallel to one another, the horizontally extending wires including an uppermost wire and a lowermost wire, and a plurality of substantially vertically extending wires arranged substantially parallel to one another, the plurality of substantially vertically extending wires extending to and between the uppermost wire and the lowermost wire and being electrically coupled to each of the horizontally extending wires,
a fiberglass post coupled between the pair of posts and directly to the web of galvanized steel, the fiberglass post extending between the uppermost wire and the lowermost wire, being arranged vertically and including openings through which the web of galvanized steel extends, wherein the openings do not extend through an end of the fiber glass post,
a plurality of eye bolts coupled to and between a post of the pair of posts and the fiberglass post between adjacent horizontal wires of the web, wherein the fiberglass post extends through eyes of the eye bolts, and
a grounded energizer operatively coupled to the web for electrifying the web,
wherein each horizontally extending wire is separated from an adjacent one of the horizontally wires by about 10 inches and each vertically extending wire of the plurality of vertically extending wire is separated from an adjacent one of the plurality of vertically extending wire by about 12 inches.

12. The fence according to claim 11 wherein the lowermost wire is suspended above the ground along the entire length of the lowermost wire.

13. The fence according to claim 11 wherein each wire of the plurality of substantially vertically extending wires and two of the horizontally extending wires are 12.5 gauge wires and two of the horizontally extending wires are 11 gauge wires.

14. The fence according to claim 11 wherein the web of galvanized steel is tied directly to the fiberglass post.

\* \* \* \* \*